W. B. ESPENT.
Rotary Engine or Pump.
No. 232,017. Patented Sept. 7, 1880.
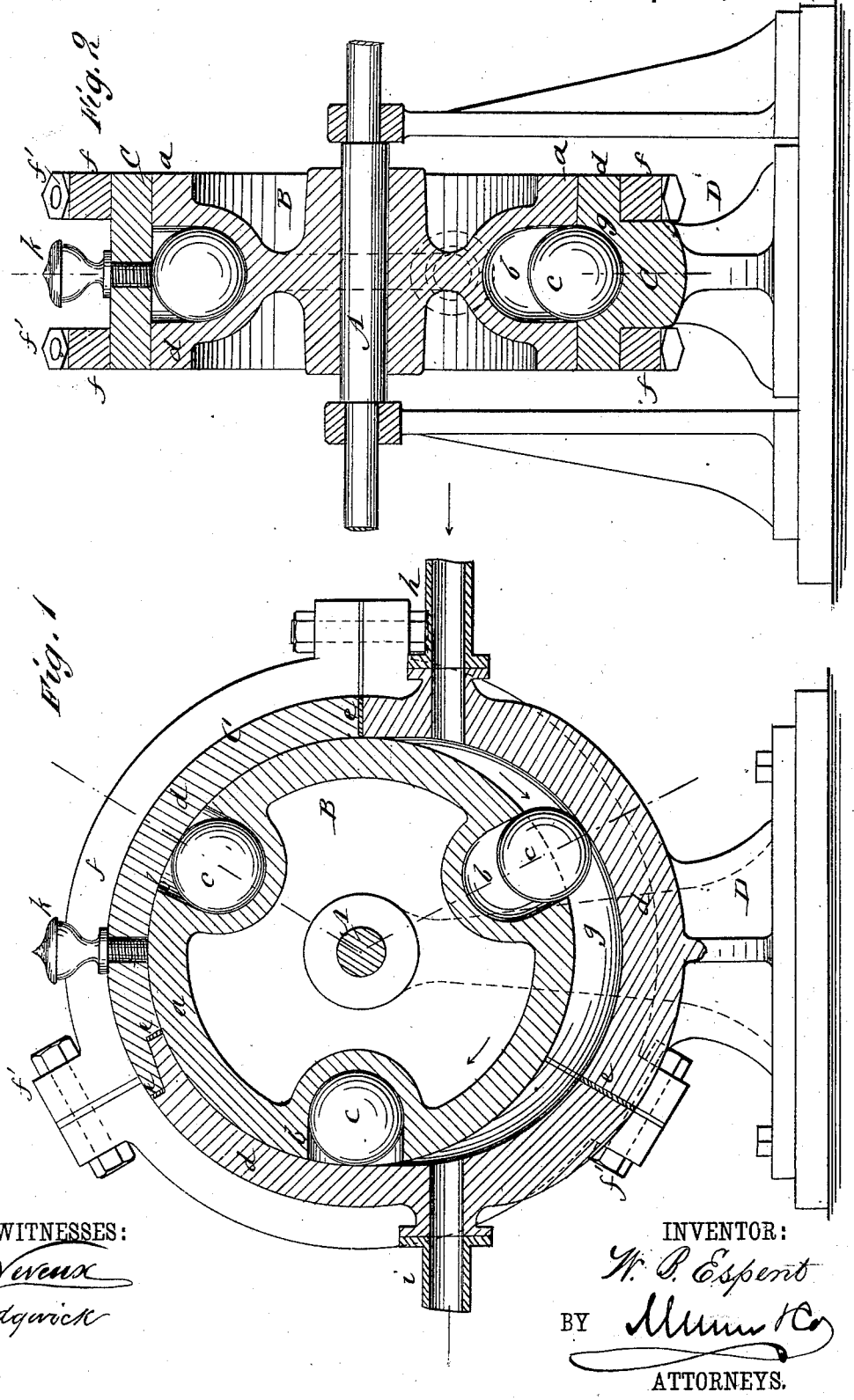

UNITED STATES PATENT OFFICE.

WILLIAM B. ESPENT, OF SPRING GARDEN, JAMAICA, WEST INDIES.

ROTARY ENGINE OR PUMP.

SPECIFICATION forming part of Letters Patent No. 232,017, dated September 7, 1880.

Application filed December 23, 1879.

*To all whom it may concern:*

Be it known that I, WILLIAM BANCROFT ESPENT, of Spring Garden, Jamaica, West Indies, have invented a new and Improved Rotary Engine or Pump, of which the following is a specification.

In the drawings, Figure 1 is a vertical section of my improved engine on a plane at right angles to the shaft. Fig. 2 is a vertical section in line with the shaft.

Similar letters of reference indicate corresponding parts.

My invention consists in certain novel features of construction whereby I obtain a minimum of friction-surface with a maximum of piston space and speed and a reduction of joints requiring to be packed, which features I will describe with reference to the drawings.

A is the shaft on which is keyed the revolving head or wheel B, that is covered by the stationary rim or case C. The wheel or head B is formed with a wide rim, $a$, that is provided with three spherical pockets, $b$, equidistant from each other, and containing each a ball, $c$. The balls $c$ are of a size for being contained wholly within the pockets.

The case C is attached to the stand D, and is made in two or more parts, preferably in three portions, $d$, united and forming a flat ring that covers the rim $a$ of wheel B. The ends of the portions $d$ are united by straight or lap joints with intervening packing, as at $e$, and are held by two clamping-rings, $f$, which are made in sections connected together by bolts and screws $f'$, so that they may be tightened to clamp the sections $d$ of the case tightly together and upon the rim $a$.

The lower part of the casing C is formed at its inner side, next to wheel B, with an eccentric groove, $g$, of a size and form for receiving the balls $c$. This groove $g$ extends over about one-half the inner periphery of case C, and diminishes in depth from its center portion to each end.

Near one end of groove $g$ is a pipe or pipes, $h$, communicating with the groove through the side of the case, and at the opposite side of case C is a pipe or pipes, $i$, communicating with the other end of groove $g$. These pipes $h$ $i$ are the inlet and exhaust pipes, the steam, water, or air entering by one or the other of the inlet-pipes and escaping by one or the other of the exhaust-pipes, according to the direction in which the engine is to run.

Upon the top of case C is a lubricator, $k$, for lubricating the inner surfaces.

It will be seen that the balls $c$ constitute radially-moving abutments, which fall by gravity into the groove $g$ as they reach the groove in succession by the revolution of wheel B, and the steam or water or air acts against the balls while in the groove to force the wheel B around. There will be but a limited amount of friction, and the joints required to be packed are limited in extent, and wear may be readily taken up by the clamping-bands $f$.

The construction shown permits the most economical use of the pressure and of steam by expansion.

The engine is adapted for use as a pump, in which case the shaft A and wheel B will be driven by a separate motor, and the pipes $h$ $i$ serve as inlet and outlet pipes.

Having thus described my invention, I claim as new and desire to secure by Letters Patent—

In rotary engines or pumps, the sectional case C, fitted with the clamping-rings $f$ and combined with the revolving head or wheel B, constructed as shown, and for the purposes set forth.

WILLIAM BANCROFT ESPENT.

Witnesses:
W. H. PHILLIPPS,
*Clerk at Messrs. Harvey & Bourke, Solicitors, Kingston, Jamaica.*
WILLIAM HORRETT,
*Articled clerk to Messrs. Harvey & Bourke, Solicitors, Kingston, Jamaica.*